July 15, 1947.  R. W. PARKER  2,423,900
SOLDERING IRON
Filed Feb. 27, 1945
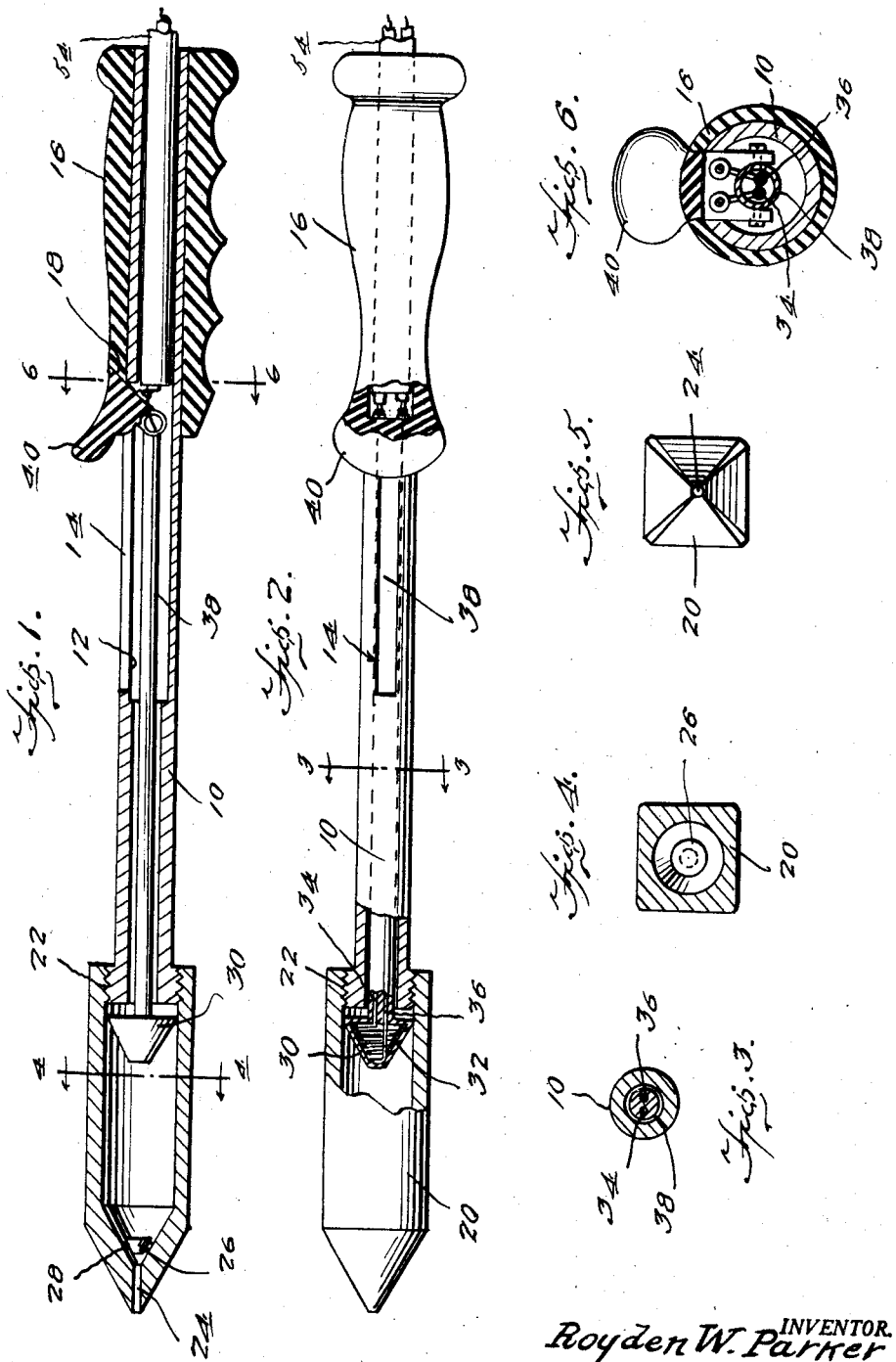
INVENTOR.
Royden W. Parker
ATTORNEYS.

Patented July 15, 1947

2,423,900

UNITED STATES PATENT OFFICE 2,423,900

SOLDERING IRON

Royden W. Parker, Haddonfield, N. J.

Application February 27, 1945, Serial No. 579,931

2 Claims. (Cl. 219—27)

This invention appertains to improvements in soldering irons and has for one of its several objects to provide an electrically heated type thereof with a holder for a supply of solder, which is maintained in a molten state by the heat radiated from the heating element and fed, in regulated amount, to the tip of the iron, as required, for the performance of soldering operations otherwise in the usual manner.

Another object of the invention has to do with the provision of a soldering iron of this kind, wherein the bit is made hollow to form a magazine or reservoir for holding a supply of solder and its tapered point, or tip, is apertured for the feeding of the solder therethrough, in molten state, to the work, the solder being reduced to such molten state by an electric heating element housed within the bit.

A further object of the invention lies in the provision of a soldering iron as above characterized, and wherein the electrical heating element serves as a plunger to force feed the molten solder from the aperture in the tip of the bit and an actuator is provided on the hand grip of the iron for manipulating the heating element relatively to the aperture, to regulate the feed of the solder outwardly therethrough to the work.

With these and other objects and advantages in view, the invention resides in the certain new and useful combination, construction, and arrangement of parts, as will be hereinafter more fully described, set forth in the appended claims, and illustrated in the accompanying drawing, in which:

Figure 1 is a longitudinal section through the improved soldering iron;

Figure 2 is a top plan view, partly in section, and showing certain of the structural details of the heating element and the actuating means therefor;

Figure 3 is a transverse section, taken through the line 3—3 on Figure 2, looking in the direction of the arrows;

Figure 4 is a sectional view similar to that of Figure 3, but taken through the line 4—4 on Figure 1, looking in the direction of the arrows;

Figure 5 is an end view of the tip end of the bit; and

Figure 6 is an enlarged, transverse section, taken through the line 6—6 on Figure 1, looking in the direction of the arrows.

Referring to the drawing in detail, the improved soldering iron, as it is exemplified therein, is comprised in a tubular frame 10, having a hand grid 16 fitted on one end and a bit 20, preferably formed of copper, removably engaged on its other end; the bit being made hollow to form a magazine or reservoir to hold a supply of solder (not shown), the solder being either a fractional length of bar stock, or in the form of a quantity of filings, shavings, or salvaged waste pieces thereof. The inner end of the hollow interior of the bit 20 is open and screw threaded for detachable connection, as at 22, with the frame end, and its outer end is made conical, in conformity with the tapered shape of the tip of the bit, and connects with an aperture 24, i. e., axial bore, opening through the latter. Positioned within the conical end of the hollow interior of the bit 20, and spaced from the wall thereof, is a baffle 26, of like form, which is disposed in line with the aperture 24, to provide a restricted passage about the same, to prevent too free a discharge of molten solder outwardly through the aperture.

Housed within the bit 20, is a heating element 30, rigidly mounted on an end of a tubular pusher member 38, extending rearwardly through the tubular frame 10. The heating element 30 is also made hollow to house a coil resistance 32, having leads extending from the same and rearwardly through the bore of the member 38. The tubular member 38 is slidable in the tubular frame 10 and has its rearwardly directed end secured, as by screws or the like 40, to an actuator member 42, which is in the form of a thumb or finger piece, slidably mounted in a slotway 14, formed in the tubular frame 10, longitudinally thereof, the latter being provided with an enlarged bore 12, extending rearwardly through the same from a point slightly in front of the forward end of the slotway 14, to provide a clearance for the inner portion of the actuator 42. The outer part of the rear end portion of the actuator 42 is shaped to conform to the shape of the forward end of the hand grip 16 and is formed with a beveled wall which abuts against a complementally beveled wall 18 of the actuator, when normally positioned. The inner part of the actuator 42 is bifurcated, as at 44, to fit over the connected end of the tubular pusher member 38, and the inner end portion of the aforesaid beveled wall carries a pair of terminal screws 46 and 48 to secure the ends of the heater coil leads 34 and 36 thereon and in contact with the ends of current supply leads 50 and 52, the latter being encased within a cord connector 54, extending outwardly from the rear end of the tubular frame 10 for connection with a current source (not shown).

In use, the bit 20 will be unscrewed from the connected end of the tubular frame 10, for the placing of a supply of solder within the same. Following this, the bit 20 will be replaced in position on the frame end and the conductor cord 54 will be connected to a suitable source of current supply. With the cord so connected, current will flow to and from the coil resistance 32, by way of the pairs of leads 34, 36, and 50, 52, and the terminal screws 46, 48. With the heating up of the element 30, the solder will be reduced to a molten state and, at the same time, heat will be transmitted to the bit 20. When ready to perform a soldering operation, the operator will grasp the hand grip 16 and apply pressure of the thumb, or a finger, to the actuator 42 to move the tubular pusher member 38 forwardly in the frame 10, causing the heater element 30 to function as a plunger to force the molten solder outwardly through the restricted passage 28 and the aperture 24, in the tip end of the bit 20, for application to the work.

Having thus fully described a preferred embodiment of my invention, it is thought that its compact and self-contained construction will merit the approval of those skilled in the art of soldering, as will also its force feed of the solder, in molten state and in regulated amount, which permits of the manipulation of the iron with one hand only, leaving the other hand free for other uses. Also, it will be understood that changes in minor details of construction and arrangement of the parts of the disclosed soldering iron may be resorted to, without departing from the spirit of the invention or its scope as claimed.

What I claim is:

1. In an electrically heated soldering iron, a tubular frame provided with a slotway, a hand-grip mounted on one end of said frame, a bit mounted on the other end of said frame, said bit being hollow to provide a reservoir for a supply of solder, the interior of said bit being in open communication with the bore in said frame and with an aperture opening through the tip of the bit, a heating element within said bit, a tubular pusher member slidably mounted in the bore of said frame and connecting said heating element at its forward end, leads extending from said heating element and rearwardly through the bore of said pusher member for connection with a source of current supply, and means slidable on said frame for moving said pusher member forwardly in said frame to cause said heating element to force-feed molten solder outwardly through the aperture in the tip of said bit, said means taking the form of a thumb piece slidably mounted in said slotway of said frame and connected to the rearwardly directed end of said tubular pusher member.

2. In an electrically heated soldering iron, a tubular frame, a hand-grip mounted on one end of said frame, a bit mounted on the other end of said frame, said bit being hollow to provide a reservoir for a supply of solder, the interior of said bit being in open communication with the bore in said frame and with an aperture opening through the tip of the bit, a heating element within said bit, a tubular pusher member slidably mounted in the bore of said frame and connecting said heating element at its forward end, leads extending from said heating element and rearwardly through the bore of said pusher member for connection with a source of current supply, and means slidable on said frame for moving said pusher member forwardly in said frame to cause said heating element to force-feed molten solder outwardly through the aperture in the tip of said bit, said heating element taking the form of a hollow plunger head for force-feeding the molten solder through the aperture in the tip and having its interior in open communication with the bore in said tubular pusher member, and a coil resistance housed within said head with the leads therefrom extending rearwardly through the pusher member.

ROYDEN W. PARKER.

REFERENCES CITED

The following references are of record in the file of this patent:

UNITED STATES PATENTS

| Number | Name | Date |
| --- | --- | --- |
| 1,127,970 | Dryfoos | Feb. 9, 1915 |
| 1,237,290 | Browning | Aug. 21, 1917 |
| 2,094,795 | Johnson | Oct. 5, 1937 |
| 2,272,780 | Schweyer | Feb. 10, 1942 |
| 2,257,580 | Trompeter | Sept. 30, 1941 |